(12) United States Patent
Brown et al.

(10) Patent No.: US 11,396,172 B2
(45) Date of Patent: Jul. 26, 2022

(54) WOOD-LIKE COATING METHOD FOR SUBSTRATE

(71) Applicant: MoistureShield, Inc., Springdale, AR (US)

(72) Inventors: Shae A. Brown, Monroe, GA (US); Eric McCann, Oxford, GA (US)

(73) Assignee: MOISTURESHIELD, INC., Springdale, AR (US)

( * ) Notice: Subject to any disclaimer, the term of this patent is extended or adjusted under 35 U.S.C. 154(b) by 0 days.

(21) Appl. No.: 16/992,288

(22) Filed: Aug. 13, 2020

(65) Prior Publication Data

US 2021/0008861 A1    Jan. 14, 2021

Related U.S. Application Data

(60) Division of application No. 16/460,219, filed on Jul. 2, 2019, now abandoned, which is a continuation of
(Continued)

(51) Int. Cl.
*B05D 5/06* (2006.01)
*B05D 7/00* (2006.01)
(Continued)

(52) U.S. Cl.
CPC ............. *B32B 33/00* (2013.01); *B05D 5/061* (2013.01); *B05D 7/576* (2013.01); *B32B 3/30* (2013.01); *B32B 27/40* (2013.01); *B05D 3/12* (2013.01)

(58) Field of Classification Search
CPC .......... B32B 33/00; B32B 3/30; B32B 27/40; B05D 5/061; B05D 1/02; B05D 5/00;
(Continued)

(56) References Cited

U.S. PATENT DOCUMENTS

| 4,200,673 A | 4/1980 | Steele |
| 4,917,955 A | 4/1990 | Porter et al. |

(Continued)

FOREIGN PATENT DOCUMENTS

| EP | 0284058 | 9/1988 |
| EP | 2072246 | 6/2009 |

(Continued)

OTHER PUBLICATIONS

European Communication pursuant to Article 94(3) EPCT for Application No. 14765829.8-1704, dated Dec. 7, 2017 (4 pgs).
(Continued)

*Primary Examiner* — William P Fletcher, III
(74) *Attorney, Agent, or Firm* — Merchant & Gould P.C.

(57) ABSTRACT

A protective coating method of a material such as aromatic polyurethane substrates is effected through a process that promotes coating adhesion to the substrate while providing a wood-like aesthetic. Closed cells on the surface of the aromatic polyurethane are opened via sanding techniques to promote adhesion. Once a sufficient surface is achieved, the substrate is coated using spray techniques to protect the aromatic polyurethane from ultra-violet light exposure. The wood-like appearance is achieved through embossing a wood-grain on the deformable surface and subsequently filling the grain with a contrasting agent to highlight its appearance through a reverse-roll-coating technique. Abrasion properties are achieved through a final clear top coat that allows both the contrast agent and the top coat to fully cure.

16 Claims, 9 Drawing Sheets

Related U.S. Application Data application No. 14/218,166, filed on Mar. 18, 2014, now Pat. No. 10,549,574.

(60) Provisional application No. 61/801,015, filed on Mar. 15, 2013.

(51) Int. Cl.
    *B05D 3/12*     (2006.01)
    *B32B 33/00*     (2006.01)
    *B32B 3/30*     (2006.01)
    *B32B 27/40*     (2006.01)

(58) Field of Classification Search
    CPC .......... B05D 7/08; B05D 7/532; B05D 7/536; B05D 7/572; B05D 7/576; B05D 2201/00; B05D 3/12; B05D 7/546; B44F 9/02
    USPC .......................................... 427/333, 337, 340
    See application file for complete search history.

(56) References Cited

U.S. PATENT DOCUMENTS

| | | | |
|---|---|---|---|
| 5,059,640 | A | 10/1991 | Hegedus et al. |
| 5,534,352 | A | 7/1996 | Pittman et al. |
| 6,379,807 | B1 | 4/2002 | Nordstrom et al. |
| 6,852,399 | B2 | 2/2005 | Takahashi et al. |
| 2001/0028945 | A1* | 10/2001 | Chen ........................ D06N 3/06 428/292.1 |
| 2005/0073804 | A1 | 4/2005 | Maruyama et al. |
| 2007/0269660 | A1* | 11/2007 | Killilea ................... C04B 41/52 428/414 |
| 2008/0010924 | A1 | 1/2008 | Pietruczynik et al. |
| 2008/0105856 | A1* | 5/2008 | DebRoy ................ C08K 5/3435 252/589 |
| 2010/0310826 | A1 | 12/2010 | Miles et al. |
| 2012/0029145 | A1 | 2/2012 | Brown |
| 2012/0288718 | A1* | 11/2012 | Takano ................ C09D 175/16 428/423.1 |
| 2019/0366759 | A1 | 12/2019 | Brown et al. |

FOREIGN PATENT DOCUMENTS

| | | | |
|---|---|---|---|
| EP | 2072246 | A2 * | 6/2009 ............ B32B 15/20 |
| EP | 2308678 | | 4/2011 |

OTHER PUBLICATIONS

Extended European Search Report for Application No. PCT/US2014/030231, dated Nov. 17, 2016 (6 pgs.).
International Search Report and Written Opinion for Application No. PCT/US2014/030231, dated Aug. 27, 2014 (17 pgs.).
International Preliminary Report on Patentability for Application No. PCT/US2014/030231, dated Sep. 24, 2015 (9 pgs.).
Sherwin Williams, Polane S Plus Polyurethane Enamel (Year: 2017).

* cited by examiner

Substrate prior to emboss    Substrate after emboss

Substrate prior to applying contrast-agent

Substrate after applying contrast-agent

Fig. 5

WOOD-LIKE COATING METHOD FOR SUBSTRATE

REFERENCE TO RELATED APPLICATIONS

This application is a divisional application of U.S. patent application Ser. No. 16/460,219, filed on Jul. 2, 2019, which is a continuation application of U.S. patent application Ser. No. 14/218,166, filed on Mar. 18, 2014, now U.S. Pat. No. 10,549,574, which claims the benefit of U.S. Provisional Patent Application No. 61/801,015, filed on Mar. 15, 2013, the disclosures of which are incorporated herein by reference in their entirety.

TECHNICAL FIELD

This invention provides a mechanical process by which a substrate formed of aromatic polyurethane, for example, can be coated in such a way that it becomes an abrasive-resistant, weatherable, and wood-like substrate, particularly for the use in exterior applications.

BACKGROUND OF THE INVENTION

Numerous man-made composites and natural materials are known for myriad uses, including exterior applications. For example, aromatic polyurethane is used in applications ranging from foam for car seats and bedding to rigid applications; the range of products made with this type of technology is vast. Exterior use of aromatic polyurethane, as well as other materials, has been limited due to degradation and discoloration upon exposure to ultra-violet light. Over time, ultra-violet light causes a radical reaction in aromatic polyurethane that breaks down the aromatic portions of the polymer, causing a severe yellowing of the substrate. In order to make an exterior product comprised mainly of aromatic polyurethane, or other materials susceptible to exterior conditions, it must be coated in such a way as to prevent ultra-violet light from reaching the substrate.

Coating composite materials for exterior use to look like wood has been carried out by various processes. Some composite materials are encapsulated in a cap-stock; this cap-stock is generally a thermoplastic type material that can be extruded. The look of wood is generally achieved by some type of embossing, in which the wood grain is three-dimensionally represented. The color variation is generally achieved by the incorporation of various colors during extrusion or pultrusion.

Coating of plastics has been achieved with a wide variety of techniques, some of which are used during the process described herein. A few techniques include, but are not limited to, general spray techniques such as high-pressure and low-pressure systems, roll-coating methods, powder coatings, hydrographics, and UV-curable coatings. Some manufacturers rely on the three dimensional wood-grain and a solid color, while others will work to add a variety of colors to the substrate using methods such as printing to achieve a wood-like appearance.

Described herein is a process by which aromatic polyurethane, for example, can be coated with a fully hiding coating which has been proven to protect the substrate while creating the appearance of wood by combining general techniques in a unique process to promote adhesion, while creating the desired wood-like appearance.

SUMMARY OF THE INVENTION

In accordance with the invention presented herein, a method is provided for coating a substrate made of, for example, aromatic polyurethane for exterior applications. The multi-step method begins with the mechanical sanding of the substrate that, in a preferred embodiment, is mostly aromatic polyurethane; this process creates a porous surface which enhances mechanical adhesion. The substrate is then coated with a plural-component coating via air assisted airless spray. The substrate can be embossed prior to or after this coating process to create the wood grain appearance. The embossed pattern is then filled with a contrasting agent that is under-indexed to prevent adhesion to all surfaces of the substrate. The excess contrasting agent is then removed using a reverse roll-coater, which is self-cleaning and provides for the reuse of the excess contrasting agent. The substrate is then coated with a clear, plural-component coating which is over-indexed and thereby upon curing allows for the contrasting agent and clear coating to adhere to the substrate. This final coat adds sheen to the substrate as well as abrasion resistance to allow for high traffic on the substrate with minimal wear and tear.

In accordance with one aspect, the present invention relates to a method for coating a substrate, comprised of the steps of pressure embossing a pattern into the substrate; base-coating the substrate with a base coating; applying an under-indexed contrasting agent to the embossed pattern of the substrate coated with the base coating; and coating the substrate applied with the under-indexed contrasting agent with an over-indexed coating.

In accordance with another aspect, the present invention relates to a method for coating an aromatic polyurethane substrate, comprising the steps of sanding the aromatic polyurethane substrate to create porosity via the opening of closed cells of the polyurethane; pressure embossing a pattern into the substrate; base-coating the substrate with a plural-component coating; applying an under-indexed contrasting agent to the substrate and subsequently removing excess contrasting agent, thereby leaving contrasting agent in the embossed pattern; and final-coating with an over-indexed clear coating.

In accordance with still another aspect, the present invention relates to a method for coating a substrate, comprising the steps of pressure embossing a pattern into the substrate; base-coating the substrate with a plural-component coating; applying a contrasting agent to the embossed pattern of the substrate, the contrasting agent comprising a plural component coating that does not have any catalyst, cross-linker, or hardening agent incorporated therein; and final-coating with a clear coating, the clear coating comprising a plural component coating that has an excess of catalyst, cross-linker, or hardening agent incorporated therein.

These and other features of the invention will become more apparent through the following summary, drawings, and description of the preferred embodiments.

BRIEF DESCRIPTION OF THE DRAWINGS

FIGS. 6A-6D depict four different configurations used to coat a substrate. FIG. 6A.1 depicts a step of embossing;

FIG. 6A.2 depicts a step of applying base coat 1;
FIG. 6A.3 depicts a step of curing;
FIG. 6A.4 depicts a step of applying base coat 2;
FIG. 6A.5 depicts a step of curing;
FIG. 6A.6 depicts a step of denib, contrast agent, reverse roll-coat;
FIG. 6A.7 depicts a step of contrast flash oven;
FIG. 6A.8 depicts a step of clear coat;
FIG. 6A.9 depicts a step of cure oven;
FIG. 6B.1 depicts a step of base coat 1;
FIG. 6B.2 depicts a step of cure oven;
FIG. 6B.3 depicts a step of base coat 2;
FIG. 6B.4 depicts a step of cure oven;
FIG. 6B.5 depicts a step of emboss;
FIG. 6B.6 depicts a step of denib, contrast agent, reverse roll coat;
FIG. 6B.7 depicts a step of contrast flash oven;
FIG. 6B.8 depicts a step of clear coat;
FIG. 6B.9 depicts a step of cure oven;
FIG. 6C.1 depicts a step of emboss;
FIG. 6C.2 depicts a step of base coat 1;
FIG. 6C.3 depicts a step of base coat 2;
FIG. 6C.4 depicts a step of cure oven;
FIG. 6C.5 depicts a step of denib, contrast agent, reverse roll-coat;
FIG. 6C.6 depicts a step of contrast flash oven;
FIG. 6C.7 depicts a step of clear coat;
FIG. 6C.8 depicts a step of cure oven;
FIG. 6D.1 depicts a step of base coat 1;
FIG. 6D.2 depicts a step of base coat 2;
FIG. 6D.3 depicts a step of cure oven;
FIG. 6D.4 depicts a step of emboss;
FIG. 6D.5 depicts a step of denib, contrast agent, reverse roll-coat;
FIG. 6D.6 depicts a step of contrast flash oven;
FIG. 6D.7 depicts a step of clear coat; and
FIG. 6D.8 depicts a step of cure oven.

DETAILED DESCRIPTION OF THE INVENTION

The following definitions describe some of the technical terms used throughout the description, but are not intended to be limiting.

Base coat—a base coat on the substrate; in a preferred embodiment, a fully hiding, fully pigmented, plural component coating.

Contrast agent—a coating contrasting with the base coat on the substrate; in a preferred embodiment, a translucent un-catalyzed coating used to enhance the look of the embossed wood grain.

Clear-Coat—a coating covering the contrast agent and the base coat on the substrate; in a preferred embodiment, an abrasion-resistant, non-pigmented, over-indexed plural component coating.

Denibbing—a process in which nibs are removed from the finished surface of the substrate; for example, this can be thought of as light sanding with a flap wheel on all surfaces, excluding the bottom portion of the substrate that is on the conveyor.

Emboss—to mold, deform, or carve in relief; as applicable to this method, a pre-molded embossing wheel is used to indent the negative image of wood-grain on the surface of the deformable substrate.

Flash—heating the substrate just enough to remove some of the volatile components of a coating, thereby partially drying the coating.

Over-indexed coating—for example, a plural component paint that has an excess of catalyst, cross-linker, or hardening agent incorporated therein Post-base-coat—anything occurring to the substrate after the substrate has had the base coat applied.

Pre-base-coat—anything occurring to the substrate before the substrate has had the base coat applied.

Substrate—a base material; in a preferred example, materials comprised of more than 50% closed-cell aromatic polyurethane.

Under-indexed coating—for example, a plural component paint that does not have any catalyst, cross-linker, or hardening agent incorporated therein.

Wet on wet application—application of the coating in which a first base coat is not cured, and a second base coat is applied directly on top of the wet first base coat.

Wet on dry application—application of the coating in which the first base coat is fully cured, and the second base coat is applied directly on top of the fully cured first base coat, which is then cured as well.

Figure 1:
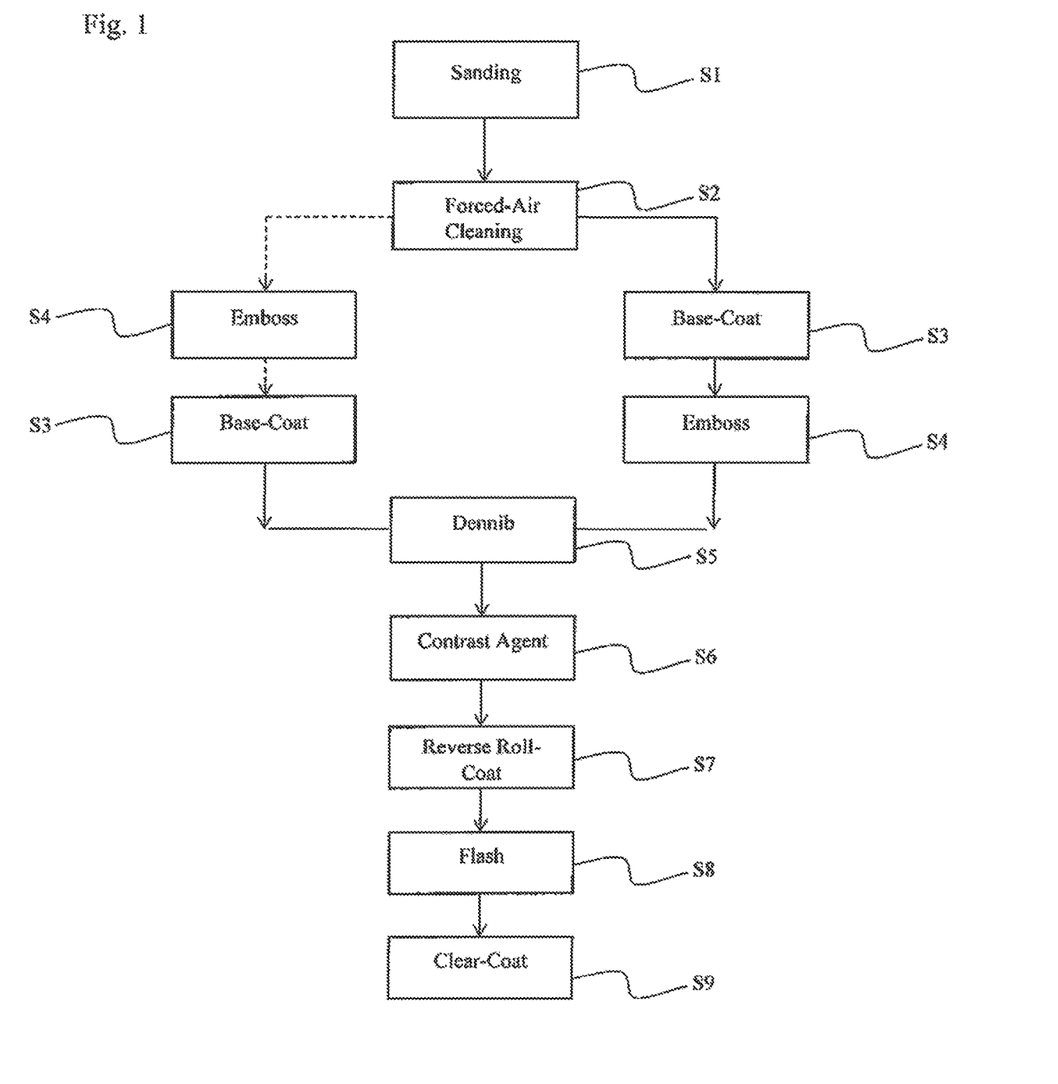
FIG. 1 is a flow chart of a coating process of an embodiment of the present invention.

A method has been devised, through experimentation and testing, for coating a substrate 10, such as a substrate formed of aromatic polyurethane, which allows for the use of the substrate in exterior applications. The various steps are shown in FIG. 1.

Step S1 of the method described herein is to sand the substrate in order to remove any smooth portions of the substrate, particularly when formed of aromatic polyurethane. In a preferred embodiment, the substrate is in the shape of lumber of any desired size, and can be shaped by any known process for a particular material. The sanding process opens up the closed cells located at the surface of the substrate creating a rough surface. This rough surface is used to promote the mechanical adhesion of the coating to the substrate. The sanding should be sufficient enough to promote adhesion, but not so aggressive as to affect any type of filler that may be used for the production of the substrate. General sanding methods as well as known mechanical sanding machines can be employed in this step of the process.

Step S2 of the method described herein is to clean the sanded substrate 10. As is apparent to those of ordinary skill in the area of coatings, all dust must be removed before coating. This is accomplished through forced air and/or vacuuming the excess dust from the substrate using known methods and apparatuses.

Step S3 of the method described herein is to coat the substrate 10 with a fully hiding layer of base coat. The coating system can utilize a thermal cure two-component polyurethane based system. Preferably, the similarities between the chemistries of the substrate and that of the base coating promote excellent adhesion to the sanded substrate. The base coating can contain three components: paint, hardener and thinner. These three components can be combined in specific mix ratios in the following ranges 3-6/1/1-3 (paint/hardener/thinner). All coatings utilized are based on the same chemistries and therefore have excellent inter-coat adhesion. The base coat contains inorganic pigments that allow the coating to be fully hiding; therefore, the base coat provides the main UV-protection as it blocks excess UV radiation from reaching the substrate beneath. In addition, the materials used in the invention are not limited to those disclosed herein. Furthermore, the coating materials are not limited as long as they can achieve desired results, such as abrasion resistance, UV and weather resistance, and a wood-like appearance. The base coat is applied to the substrate using air-assisted airless spray equipment on a flat line conveyor system. The coating of the substrate may be accomplished in two ways.

Figure 2:
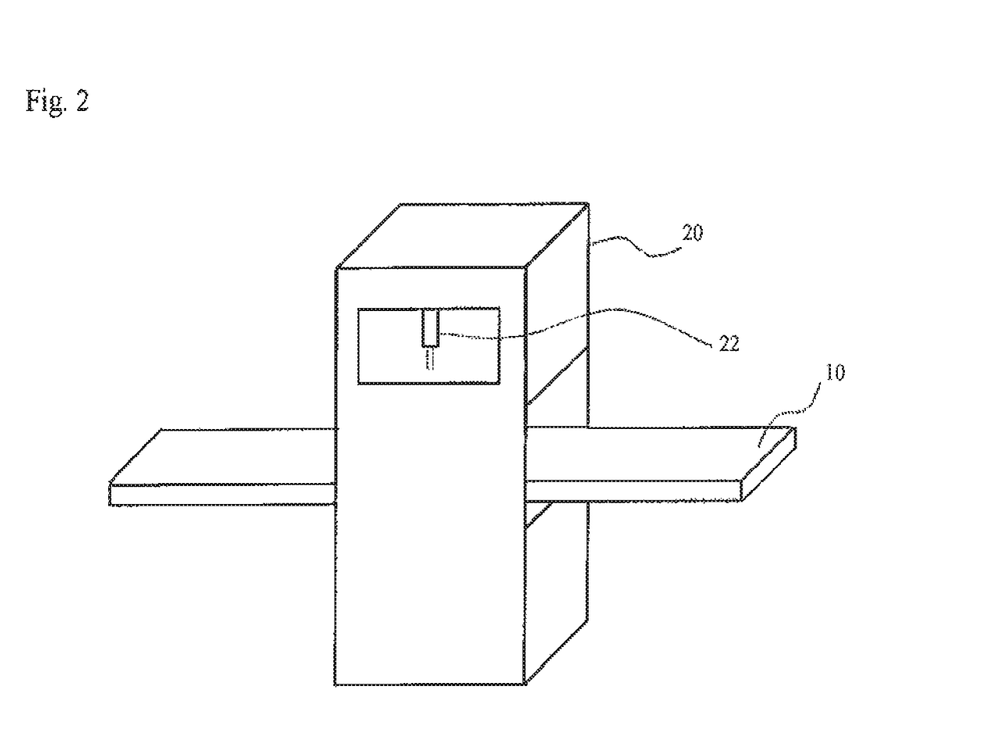
FIG. 2 depicts a flat-line spray booth set-up used in the present invention.

The first coating method will be defined as wet on dry application of first and second base coats. The first base coat is applied via air assisted airless spray methods. The spray booth 20 used to perform this step is shown in FIG. 2. The substrate 10 rides along a flat-line conveyor (not shown) through a typical spray booth set-up 20 where the substrate receives its first base coat. An example of the spray booth 20 that can be used is one fabricated to accommodate three air assisted airless spray heads 22 in order to coat the three-dimensional profiles of the substrate. The first base coat is then cross-transferred to an oven conveyer (not shown). The substrate is then fully cured by maintaining the surface temperature of the substrate at approximately 235° F. over the course of approximately 8-10 minutes through a natural gas fired oven 30 fabricated to accommodate substrates that can reach lengths of 24 feet. The second base coat, if desired, is then applied the same way as the first base coat. The substrate then travels through another curing phase.

The second coating method will be defined as a wet on wet application of the two base coats. The first base coat is applied via air assisted airless spray methods in a first spray booth 20. The substrate rides along the flat-line conveyor through another typical spray booth 20', and the second base coat is then applied the same way as the first base coat. The substrate then travels through the curing oven 30 described above to be fully cured. This coating method only requires one curing phase, whereas the first coating method described above requires two curing phases. This second coating method leads to a very similar appearance as the previously described method; however, the second base coat does not remain as close to the surface as it does in the first coating method, leading to a slightly less uniform appearance than that obtained in the first coating method.

The first coating method tends to give the substrate a slightly more uniform and even coating because the second base coat can more readily reside closer to the surface of the substrate when applied to a previously cured first base coat. The second coating method is described as a more economical alternative to the first coating method as a curing step is removed from the process, and as a potential method to add diversity to the substrate, leading to a more wood-like appearance.

Figure 3:
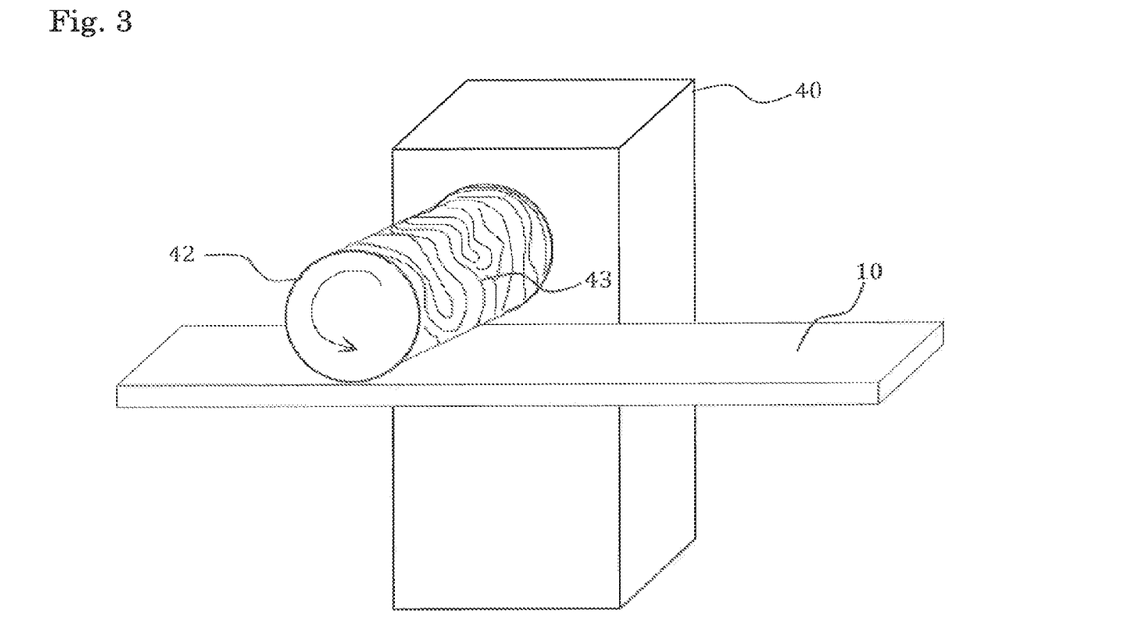
FIG. 3 depicts a flat-line embossing wheel used to create a three-dimensional wood grain appearance in the present invention.
Figure 3A:
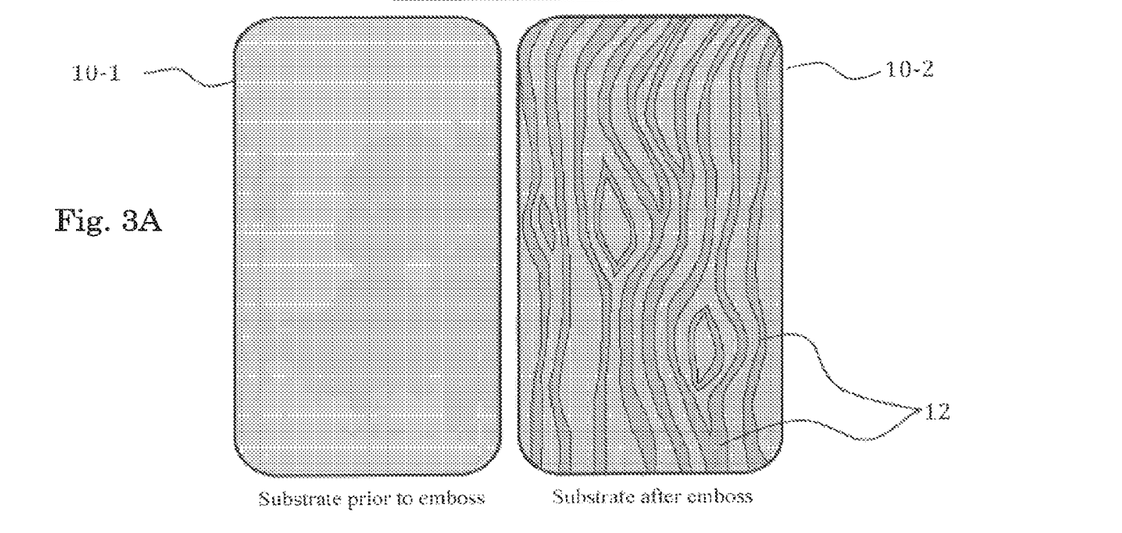
FIG. 3A depicts a pre-emboss and a post-emboss substrate.

Step S4 of the method described herein is to create a wood grain appearance on the surface of the substrate. Due to the deformability of the substrate, particularly when aromatic urethane is used, a pressure embossing wheel is used to indent the surface of the substrate, leaving a wood grain emboss. This is depicted in FIG. 3, in which emboss wheel 42 of embossing machine 40 has a negative image of wood-grain and the substrate 10 rides along a flat-line conveyor (not shown). For the preferred substrate, aromatic polyurethane, this process is done only with pressure; no heat is involved. A flame-hardened seamless steel roller 42 engraved with the negative image of a wood grain pattern 43 is used to indent the surface of the substrate, depicted in FIG. 3. As the substrate rides along the flat-line roller conveyor, the embossing wheel 42 rotates so as to pull the substrate through the process while deforming the surface using pressure. The enlarged portions of FIG. 3 depict a schematic of the surface of the substrate pre-emboss 10-1 and post-emboss 10-2. The darker areas indicate the areas in which the surface is depressed to create the wood-grain emboss pattern 12. The embossing of the substrate can occur before or after base-coating, the former being shown on the left side of FIG. 1 using dashed lines where step S4 is followed by step S3. The coating used must be flexible enough to deform with the substrate without incurring damage or points of potential failure. The embossing wheel 42 has a length at least as wide as the base material.

If the substrate is base-coated prior to embossing, the embossed pattern will be minimally deeper upon starting the next process, thereby making the contrast agent pool more within the grain pattern, leading to a slightly darker wood grain appearance. If the substrate is embossed prior to base-coating the base coat can fill in a small portion of the grain pattern, thereby making the contrast agent pool less within the grain pattern, leading to a slightly lighter wood grain appearance.

Figure 4:
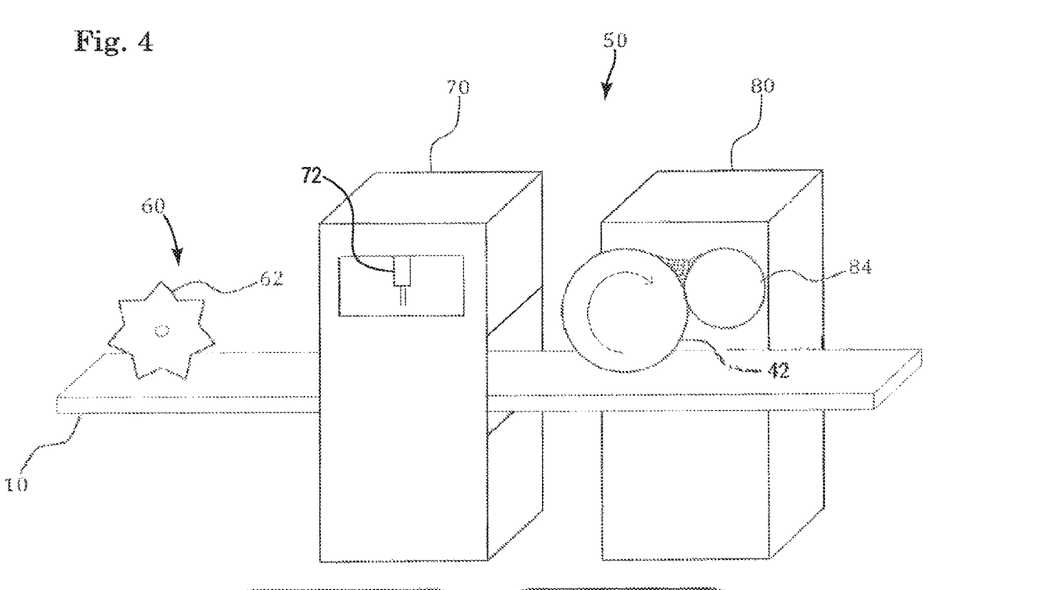
FIG. 4 depicts a flat-line grain enhancer, which performs denibbing of the substrate, followed by spraying of a contrast agent, followed by reverse roll-coating of excess contrast agent from the surface of substrate.
Figure 4A:
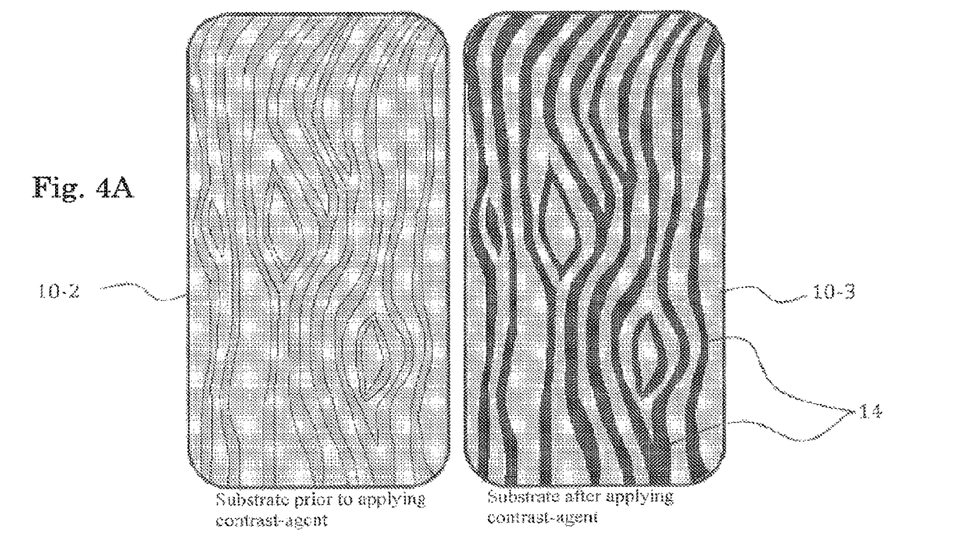
FIG. 4A depicts the substrate before applying the contrast agent and after applying the contrast agent.

Step S5 of the method described herein is to promote inter-coat adhesion and flow of a contrast agent into the emboss pattern. The base-coated substrate is preferably sent through a commercially available denibbing system 60 that utilizes 100-220 grit flap sanders 62 to denib all surfaces of the substrate to be coated, as shown in FIG. 4. This process can remove nibs within the base-coated substrate to create a better surface for the remainder of the coating. The denibbed substrate is cleaned with forced air and vacuum (not shown) to remove particulates that may interfere with inter-coat adhesion.

Step S6 of the method described herein is to apply a darker translucent coating, known as the contrast agent, to the embossed pattern of the substrate shown in FIG. 4. The contrast agent is a non-catalyzed coating that is greatly reduced in viscosity, to between 12-40 centistokes, to allow for flow of the coating into the embossed pattern. The contrast agent is lightly sprayed onto the entire surface of the base-coated substrate using a single air assisted airless spray gun 72 with a large spray fan pattern to completely saturate the surface of the substrate. The substrate is transferred via conveyor (not shown) through a commercially-available, down-draft spray booth 70.

In Step S7, the excess contrast agent is removed via a self-cleaning commercially available reverse roll-coater 80 outfitted with a 50 durometer rubber roll 82 as shown in FIG. 4. A cleaning roller 84 can remove the recovered contrasting agent from the roll 82 for reuse. This portion of the process leaves the majority of the contrasting agent 14 in the embossed pattern 12 while removing the remaining contrast agent from the surface of the substrate as shown in the enlarged image of the substrate 10-3.

In the foregoing description, the denibber 60, spray booth 70 and reverse roll-coater 80 can be positioned at a single station 50.

Figure 5:
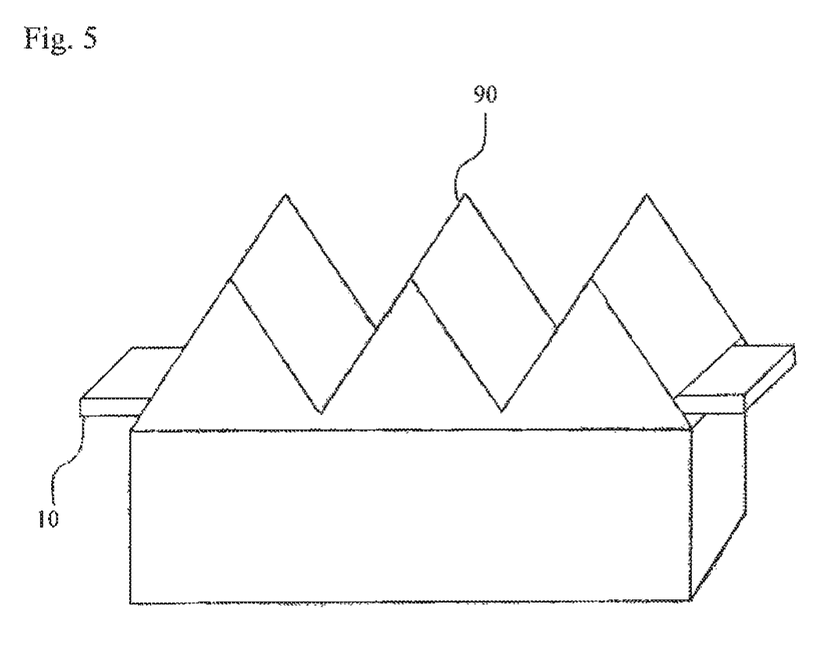
FIG. 5 depicts a contrast flash oven, used to prepare contrast for clear-coating.

The substrate, in Step S8, then travels on the flat line conveyor system (not shown) through a natural gas fired contrast flash oven 90 fabricated to fit over the conveyor system. The substrate spends approximately 5-10 seconds at 165-180° F. underneath the flash oven; this allows enough time for the contrast to be partially dried in preparation for clear coating. The flash-off of excess solvents within the contrast agent allows the coating to remain within the grain pattern during clear-coating (described later). A fully wet contrast agent can easily be washed out of the grain pattern by the clear-coat, leading to a muddled surface appearance, which does not highlight the wood grain embossed pattern.

Step S9 of the method described herein is to apply an over-indexed clear coat to the substrate. The clear coat is based on the same chemistries as both the base coats and contrast agent; it, however, does not contain pigment and is completely transparent and therefore minimally contributes to the UV protection of the underlying substrate. The clear coat provides abrasion resistance as well as luster to the substrate. The application of the clear-coat goes directly on top of the partially-dried contrast agent. The clear coat is applied via air assisted airless spray equipment 100 on a flat line conveyor system. The coating is then thermally cured in oven 110. The over-indexed clear coat allows the un-catalyzed contrast agent to fully cure as well.

While the foregoing description describes performing the various steps in a particular order, that order is not limiting. Several possible configurations are shown in FIGS. 6A-6D. Each process described below begins with sanding of the substrate to promote adhesion.

Figure 6A:
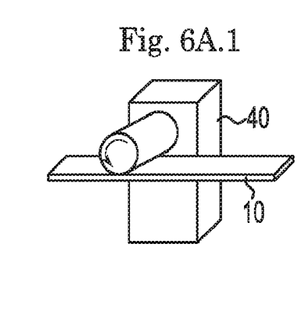
Figure 6A:
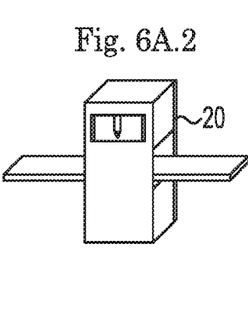
Figure 6A:
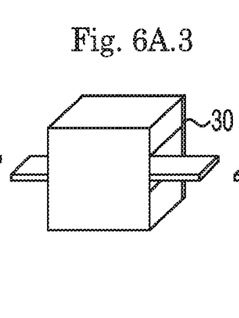
Figure 6A:
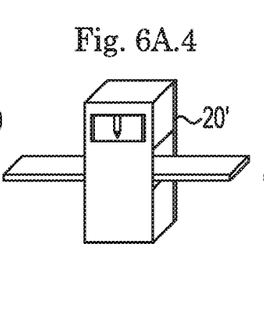
Figure 6A:
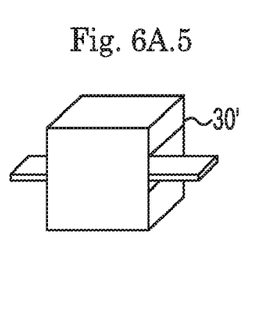
Figure 6A:
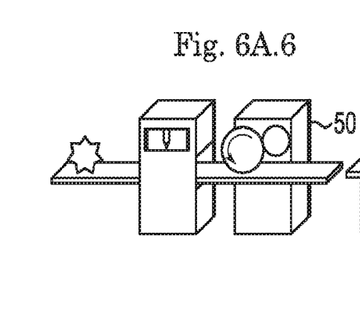
Figure 6A:
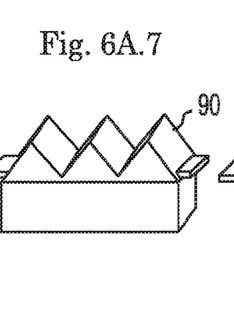
Figure 6A:
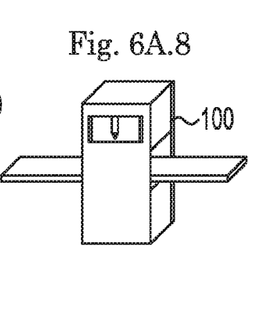
Figure 6A:
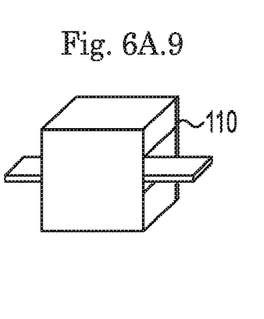
Figure 6B:
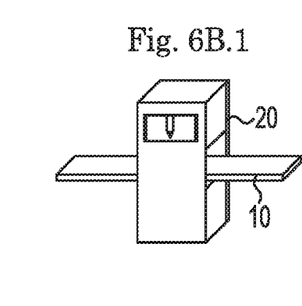
Figure 6B:
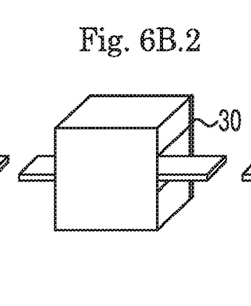
Figure 6B:
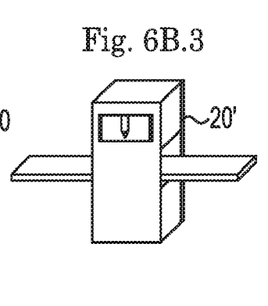
Figure 6B:
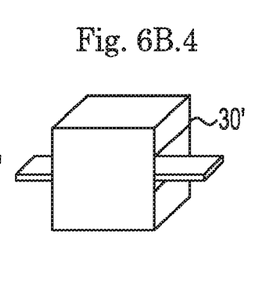
Figure 6B:
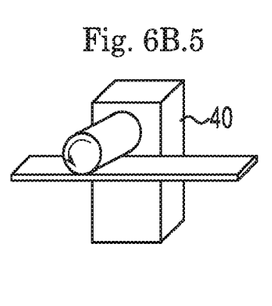
Figure 6B:
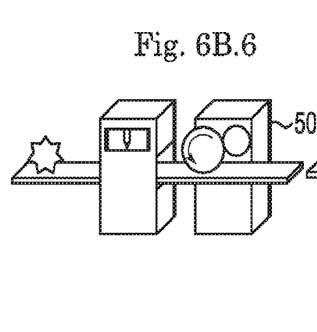
Figure 6B:
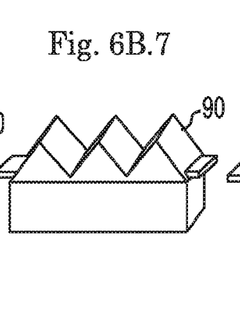
Figure 6B:
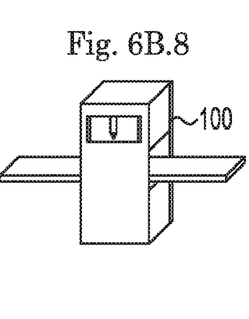
Figure 6B:
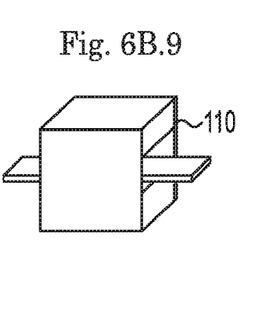
Figure 6C:
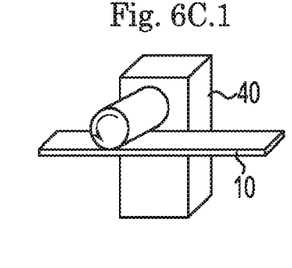
Figure 6C:
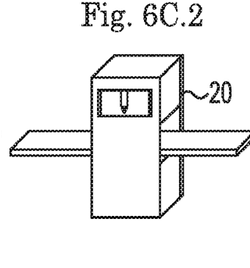
Figure 6C:
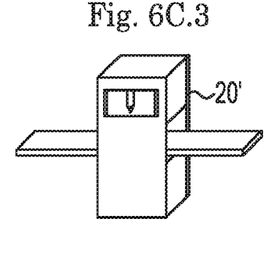
Figure 6C:
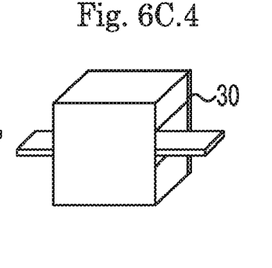
Figure 6C:
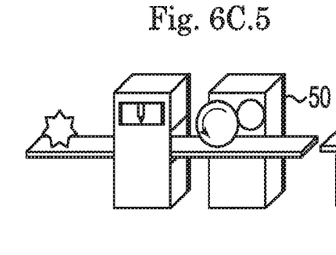
Figure 6C:
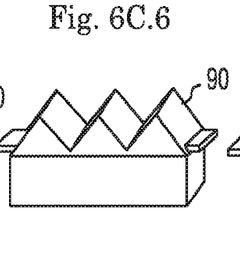
Figure 6C:
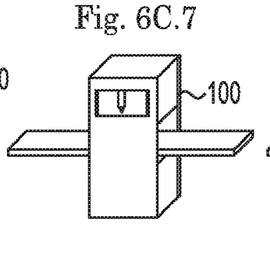
Figure 6C:
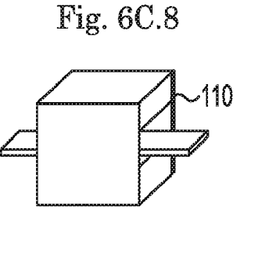
Figure 6D:
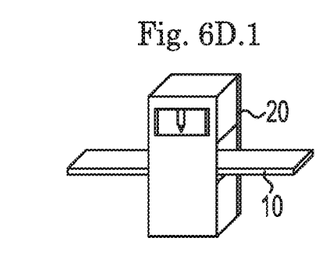
Figure 6D:
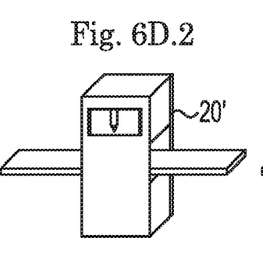
Figure 6D:
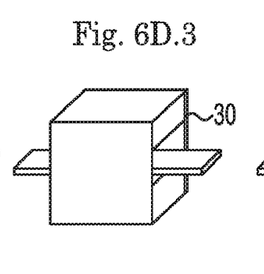
Figure 6D:
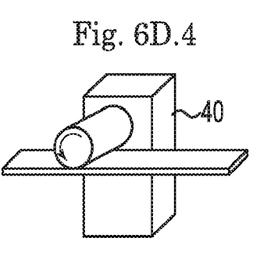
Figure 6D:
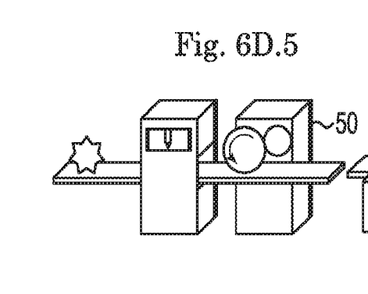
Figure 6D:
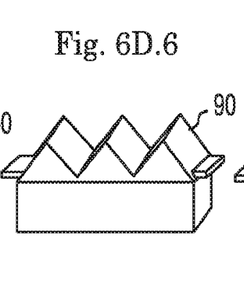
Figure 6D:
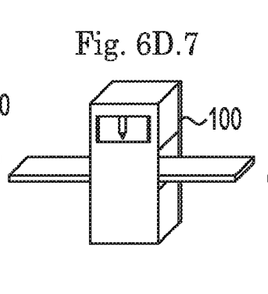
Figure 6D:
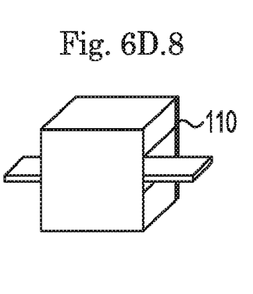

1) Pre-emboss, wet on dry application of coating, shown in FIG. 6A.
6A.1—emboss
6A.2—base coat 1
6A.3—cure oven
6A.4—base coat 2
6A.5—cure oven
6A.6—denib, contrast agent, reverse roll-coat
6A.7—contrast flash oven
6A.8—clear coat
6A.9—cure oven 1) Pre-emboss, wet on dry application of coating, shown in FIG. 6A.
6A.1—emboss
6A.2—basecoat 1
6A.3—cure oven
6A.4—base coat 2
6A.5—cure oven
6A.6—denib, contrast agent, reverse roll-coat
6A.7—contrast flash oven
6A.8—clear coat
6A.9—cure oven 3) Pre-emboss, wet on wet application of coating, shown in FIG. 6C.
6C.1—emboss
6C.2—base coat 1
6C.3—base coat 2
6C.4—cure oven
6C.5—denib, contrast agent, reverse roll-coat
6C.6—contrast flash oven
6C.7—clear coat
6C.8—cure oven 4) Post-emboss, wet on wet application of coating, shown in FIG. 6D.
6D.1—base coat 1
6D.2—base coat 2
6D.3—cure oven
6D.4—emboss
6D.5—denib, contrast agent, reverse roll-coat
6D.6—contrast flash oven
6D.7—clear coat
6D.8—cure oven In each of the foregoing configurations, the conveying system is not shown. The conveying system can be comprised of a single conveying system including belts and rollers, for example, for moving the base material through the various stations; individual conveyance systems modified for each station; or two or more conveyance systems, each for moving the substrate material through one or more stations comprising the whole system. In the event that one or more conveying mechanisms are used, a controller, such as a suitably programmed microprocessor, can be used to control the various speeds of conveyance. Differences in required conveying speeds between the various stations can be controlled by the controller. Alternatively, the substrate materials can be moved manually or by other means from station to station.

Control of the various stations can be coordinated with the conveyance control using the controller described above or one or more additional controllers or sub-controllers.

Thus, there has been shown and described a new and useful method and system for creating wood-like substrates. Although this invention has been exemplified for purposes of illustration and description by reference to certain specific embodiments, it will be apparent to those skilled in the art that various modifications, alterations, and equivalents of the illustrated examples are possible.

What is claimed is:

1. A method for coating a substrate, the method comprising:
pressure embossing a pattern into the substrate to form a patterned substrate having an embossed pattern;
coating the patterned substrate with a base coating to form a coated substrate;
applying an under-indexed contrasting agent to the embossed pattern of the coated substrate and removing excess under-indexed contrasting agent to form a contrasting agent coated substrate with a portion of the under-indexed contrasting agent remaining in the embossed pattern, the under-indexed contrasting agent comprising a plural component paint that does not contain a catalyst, a cross-linker, or a hardening agent; and
coating the contrasting agent coated substrate with an over-indexed coating, the over-indexed coating comprising a plural component paint comprising an excess of a catalyst, a cross-linker, or a hardening agent.

2. The method of claim 1, wherein the substrate is mechanically embossed after coating the patterned substrate with the base coating.

3. The method of claim 1, wherein the substrate comprises an aromatic polyurethane.

4. The method of claim 3, further comprising a step of sanding the substrate prior to coating the patterned substrate with the base coating to create porosity to promote mechanical adhesion.

5. The method of claim 1, wherein the substrate is mechanically embossed prior to coating the patterned substrate with the base coating.

6. The method of claim 1 wherein the excess under-indexed contrasting agent is removed by reverse roll-coating.

7. The method of claim 1, wherein the embossed pattern comprises a wood grain pattern.

8. The method of claim 1, wherein the over-indexed coating comprises an abrasion-resistant clear coating.

9. The method of claim 1, wherein the under-indexed contrasting agent is partially dried before coating the contrasting agent coated substrate with the over-indexed coating.

10. The method of claim 1, wherein the base coating comprises a fully pigmented, plural component coating.

11. The method of claim 1, wherein the base coating comprises a thermal cure two-component polyurethane based system.

12. A method for coating a substrate comprising an aromatic polyurethane, the method comprising:
- pressure embossing a pattern into the substrate comprising the aromatic polyurethane to form a patterned substrate having an embossed pattern;
- coating the patterned substrate with a base coating comprising a thermal cure two-component polyurethane based system to form a coated substrate;
- applying an under-indexed contrasting agent to the embossed pattern of the coated substrate and removing excess under-indexed contrasting agent to form a contrasting agent coated substrate with a portion of the under-indexed contrasting agent remaining in the embossed pattern, the under-indexed contrasting agent comprising a plural component paint that does not contain a catalyst, a cross-linker, or a hardening agent; and
- coating the contrasting agent coated substrate with an over-indexed coating, the over-indexed coating comprising a plural component paint comprising an excess of a catalyst, a cross-linker, or a hardening agent.

13. The method of claim 12, wherein the excess under-indexed contrasting agent is removed by reverse roll-coating.

14. The method of claim 13, wherein the under-indexed contrasting agent is partially dried before coating the contrasting agent coated substrate with the over-indexed coating.

15. The method of claim 12, wherein the over-indexed coating comprises an abrasion-resistant clear coating.

16. The method of claim 12, wherein the embossed pattern comprises a wood grain pattern.

* * * * *